(12) United States Patent
Hiroi

(10) Patent No.: US 6,256,071 B1
(45) Date of Patent: Jul. 3, 2001

(54) METHODS AND APPARATUS FOR RECORDING VIDEO FILES AND FOR GENERATING A TABLE LISTING THE RECORDED FILES AND LINKS TO ADDITIONAL INFORMATION

(75) Inventor: Kazushige Hiroi, Cupertino, CA (US)

(73) Assignee: Hitachi America, Ltd., Tarrytown, NY (US)

( * ) Notice: Subject to any disclaimer, the term of this patent is extended or adjusted under 35 U.S.C. 154(b) by 0 days.

(21) Appl. No.: 09/210,488

(22) Filed: Dec. 11, 1998

(51) Int. Cl.[7] ........................................ H04N 5/44
(52) U.S. Cl. ............... 348/553; 348/725; 348/714; 725/51
(58) Field of Search ...................... 348/1–3, 906, 348/714, 553, 10, 7, 725; 345/327; 725/39, 38, 53, 151, 152, 139, 140, 51

(56) References Cited

U.S. PATENT DOCUMENTS

| | | | |
|---|---|---|---|
| 4,706,121 | 11/1987 | Young | 358/142 |
| 4,845,644 | 7/1989 | Anthias et al. | 364/521 |
| 5,442,390 | 8/1995 | Hooper et al. | 348/7 |
| 5,614,940 | 3/1997 | Cobbley et al. | 348/7 |
| 5,617,565 | 4/1997 | Augenbraun et al. | |
| 5,815,146 | 9/1998 | Youden et al. | 345/327 |
| 5,818,935 | * 10/1998 | Maa | 380/20 |
| 5,914,941 | * 6/1999 | Janky | 370/313 |
| 5,933,603 | 8/1999 | Vahalia et al. | 395/200.55 |

FOREIGN PATENT DOCUMENTS

| | | |
|---|---|---|
| 0 574 068 A2 | 12/1993 | (EP) . |
| WO 96/37996 | 11/1996 | (WO) . |
| WO 98/03016 | 1/1998 | (WO) . |
| WO 98/17063 | 4/1998 | (WO) . |

\* cited by examiner

*Primary Examiner*—Victor R. Kostak
(74) *Attorney, Agent, or Firm*—Straub & Pokotylo; Michael P. Straub

(57) ABSTRACT

A receiver arranged to receive and store broadcast data transported by elementary stream of a multiplexed and modulated digital television signal in a rewritable memory during a low power consumption mode for later recall by a user of the receiver. For recall, the receiver is fully energized, and the receiver is further arranged to transfer the broadcast data stored in the rewritable memory to a receiver storage device for further processing of the data under control of the user.

20 Claims, 8 Drawing Sheets

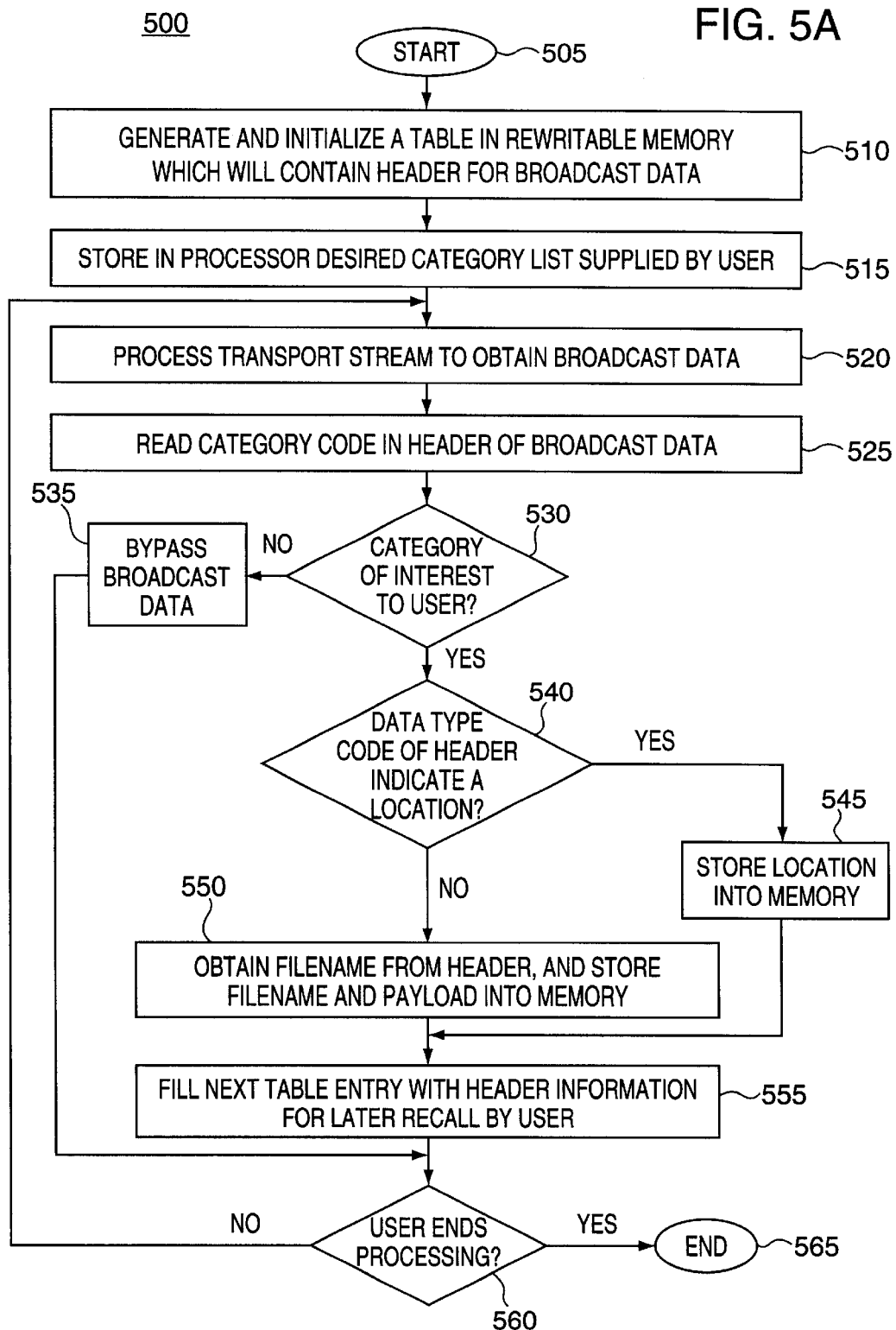

| | 610 | 620 | 630 | 640 | 650 |
|---|---|---|---|---|---|
| 601 | CATEGORY 1 | DATE 1 | TIME 1 | DESCRIPTION 1 | FILENAME 1 |
| | CATEGORY 2 | DATE 2 | TIME 2 | DESCRIPTION 2 | FILENAME 2 |
| 603 | CATEGORY 3 | DATE 3 | TIME 3 | DESCRIPTION 3 | LOCATION 1 |
| | CATEGORY 1 | DATE 4 | TIME 4 | DESCRIPTION 4 | FILENAME 3 |
| | CATEGORY 3 | DATE 5 | TIME 5 | DESCRIPTION 5 | LOCATION 2 |
| | ... | ... | ... | ... | ... |

FIG. 6

METHODS AND APPARATUS FOR RECORDING VIDEO FILES AND FOR GENERATING A TABLE LISTING THE RECORDED FILES AND LINKS TO ADDITIONAL INFORMATION

BACKGROUND OF THE DISCLOSURE

1. Field of the Invention

This invention relates to broadcast communication systems and, more particularly, to broadcast data propagated in a digital television system.

2. Description of the Background Art

In a conventional Digital Television (DTV) system, video data, audio data, and broadcast data are multiplexed into one program transport stream by a transmitter for downstream processing by at least one receiver. The transmitter, besides being composed of video and audio generators, includes a broadcast data generator for providing supplementary services to the broadcast community; broadcast data does not conform to any standards or format. Examples of broadcast data include: (1) Web home pages; (2) Uniform Resource Locator (URL) of a Web site; and (3) computer programs executable upon a personal computer.

In the receiver, a user of the receiver can select from a set of DTV channels using a tuner to detect an individual modulated DTV channel signal propagated at a given carrier frequency. A demodulator detects the incoming transport stream for the given channel, and the demodulated stream is split into video data, audio data, and broadcast data by a demultiplexer. A video circuit then reconstructs the video from the video data for display on a display device; similarly audio is reconstructed from the audio data.

The broadcast data is processed by a central processing unit. In particular, if the incoming broadcast data is representative of a home page on the Web, or a URL, this data is stored on a disk. If the incoming broadcast data is a program, the program may be executed by the CPU or stored for later execution. In this case, the result of executing the program, if a display is required, will be generated by the CPU and be delivered to the video circuit for processing and display on the display device. Whether or not the data is to be stored, and when a program is to execute, is under control of the user.

Broadcast data oftentimes is transitory, so a user who does not store the broadcast data in the receiver when it is propagated will not have another opportunity to receive the data. Thus, if a user's receiver is turned-off, inadvertently or intentionally, when data of possible interest is broadcast, the data will be missed by the user. Typically, the receiver is turned-off intentionally while the user, for example, is away from home or has retired for the night, so the user may reduce electricity costs.

Also, it may be possible that a user not having an interest in broadcast data at one time may, at a later time, have renewed interest in the data. Therefore, there are situations in which the user desires to "browse" and find interesting data later from a stored body of data. Representative of techniques for storing broadcast data for later recall is the subject matter disclosed in U.S. Pat. No. 5,617,565 issued to Augenbraun et al, entitled "Broadcast Interactive Multimedia System" (BIM System), and assigned to the assignee of this patent application. In this reference, broadcast data in the form of data elements is captured based upon a user profile established initially by the user, and which profile is dynamically altered as the user selects incoming data elements. The BIM System teaches and suggests that all components of the receiver must be energized at all times in order to capture the data and process the data, including the step of dynamic modification of the user profile. Moreover, the BIM System teaches and suggests that all data elements inherently include the data itself, for example, a newspaper article, a technical paper, stock market data, or a magazine article. There is no teaching or suggestion that a data element may be, in essence, a pointer which points to the actual data itself, such as a URL address which points to a Web page. Nor is there any teaching or suggestion that the data may be an executable program which may be invoked at the discretion of the user.

As discerned from the foregoing discussion, the art is devoid of teachings and suggestions related to systems which provide the combined, desirable properties of: low power consumption; capture of broadcast data of interest to the user in the low power consumption mode; the ability to browse for interesting broadcast data at a time following the actual broadcast of the data when the entire receiver is in the full-ON or high power consumption mode; using a pointer to provide the location of data which can be obtained once the receiver is full-ON to thereby mitigate storage requirements in the low power consumption mode; invoking executable code as conveyed by the broadcast data at the discretion of the user; and transfer of the stored data from a first memory operational in the lower power consumption mode to a second memory operational only during the full-ON mode for manipulation by the user.

It should be emphasized, by way of distinguishing the BIM System from the method and concomitant circuitry in accordance with the present invention, that the principles of the BIM system can be incorporated into the operation of the method and circuitry of the present invention so as to more closely match the user's interest at any given moment, but the BIM System does not include the aforementioned properties which are strictly the domain of the present invention.

SUMMARY OF THE INVENTION

The shortcomings of the prior art as well as other limitations and deficiencies are obviated, in accordance with the present invention, by a receiver that is arranged to receive and store broadcast data in a memory during a low power consumption mode, and which is further adapted to transfer the stored broadcast data to a receiver storage device when the receiver is fully energized for browsing the data by the user.

In accordance with a broad method aspect of the present invention, a method for receiving, in a receiver, broadcast data propagated by a multiplexed and modulated digital television signal, the signal including video data as well as at least one elementary stream conveying the broadcast data, the broadcast data including a header and, if necessary, a payload, the receiver including: (i) a tuner for tuning to the signal under control of a user of the receiver; (ii) a demodulator, coupled to the tuner, for demodulating the signal and to generate a transport stream conveying the broadcast data; (iii) a demultiplexer, coupled to the demodulator, for demultiplexing the transport stream to detect the broadcast data; (iv) a data processor responsive to the demultiplexer and control signals from the user for processing broadcast data; (v) a rewritable memory coupled to the data processor; and (vi) a display device for displaying the video data as well as displayable data corresponding the broadcast data, the method including: (a) continuously applying power to the tuner, the demodulator, the demultiplexer, the data processor, and the rewritable memory independent of the on-off state of the display device; (b) upon initialization of the data processor, generating and storing a table in the rewritable memory to be filled in by the data processor during the succeeding steps; (c) processing in the data processor the header to obtain field information conveyed by the header; (d) if the field information indicates that the broadcast data contains a data file to be stored, storing the filename and the payload of the broadcast data corresponding to the data file in the rewritable memory, and proceeding to (f); (e) if the field information indicates that the broadcast data contains a location to be stored, storing the location only in the rewritable memory; and (f) storing the field information in the table for later recall of the field information and either the data file or the location by the user.

In accordance with the broad system aspect of the invention, a receiver for receiving broadcast data propagated by a multiplexed and modulated digital television signal, the signal including video data and at least one elementary stream conveying the broadcast data, the broadcast data including a header and, if necessary, a payload, includes: (1) a tuner for tuning to the signal under control of a user of the receiver; (2) a demodulator, coupled to the tuner, for demodulating the signal to generate a transport stream conveying the broadcast data; (3) a demultiplexer, coupled to the demodulator, for demultiplexing the transport stream to detect the broadcast data; (4) a data processor, responsive to the demultiplexer and input from the user, for processing the broadcast data; (5) a rewritable memory, coupled to the data processor, for storing the broadcast data; and (6) a display device, responsive to the data processor, for displaying, when energized, the video data as well as displayable data representative of the header and payload of the broadcast data, wherein: (a) the tuner, the demodulator, the demultiplexer, the data processor, and the rewritable memory being continuously on independent of the on-off state of the display device; (b) the rewritable memory including a table for storing the broadcast data; and (c) the data processor includes (i) a header processor for processing the header to obtain field information conveyed by the header; (ii) a field processor to determine if the field information indicates that the broadcast data contains a filename to be stored and means for storing the filename and the payload of the broadcast data corresponding to the filename in the rewritable memory; (iii) the field processor also being used to determine if the field information indicates that the broadcast data contains a location to be stored and means for storing the location only in the rewritable memory; and (v) a storage processor for storing the field information as an entry in the table for later recall of the field information and either the filename or the location by the user.

Other aspects of the methodology and concomitant circuitry relate to: processing the broadcast data based upon interest categories selected by the user; processing each incoming elementary broadcast data stream over an interval controlled by the user; and later recalling an using the broadcast data as stored in the rewritable memory under control of the user.

BRIEF DESCRIPTION OF THE DRAWING

The teachings of the present invention can be readily understood by considering the following detailed description in conjunction with the accompanying drawing, in which:

FIG. 6 depicts table entries as obtained from the broadcast data; and

To facilitate understanding, identical reference numerals have been used, where possible, to designate identical elements that are common to the figures.

DETAILED DESCRIPTION

After considering the following description, those skilled in the art will clearly realize that the teachings of my invention can be readily utilized in providing broadcast data services over a DTV system utilizing the following methodology and concomitant circuitry.

It is instructive to first consider the conventional operation of the DTV system for transmitting and receiving broadcast data. The primary purpose for elucidating this conventional operation is that of highlighting the functionalities of the conventional system which are utilized in accordance with the various aspects of the present invention. This description also introduces terminology used in the presenting an illustrative embodiment of the present invention.

Overview of Conventional System

Figure 1:
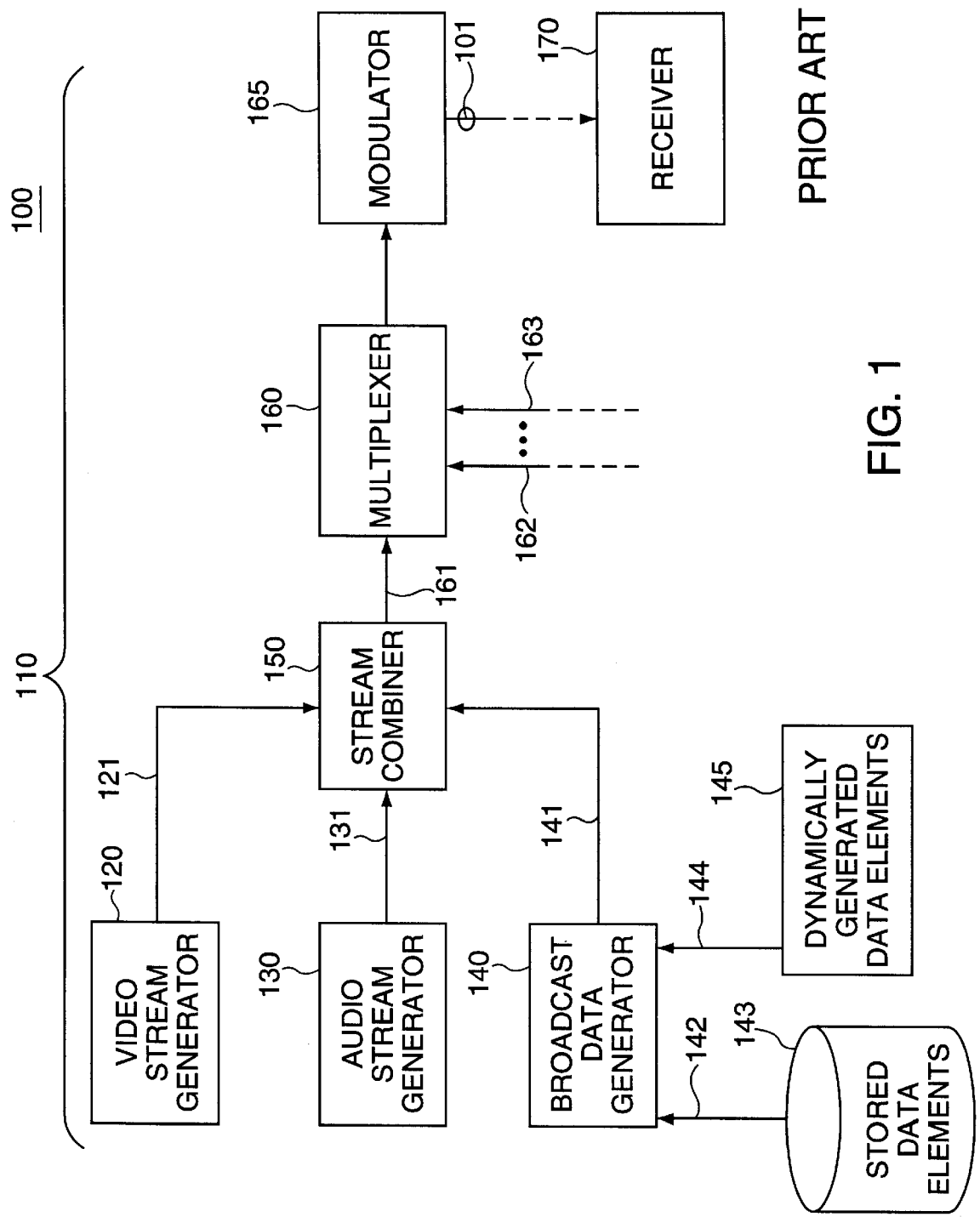
FIG. 1 illustrates a high-level block diagram of a conventional transmitter-receiver combination for broadcasting digital TV signals.

With reference to FIG. 1 there is shown, in high-level block diagram form, conventional Digital Television Broadcast (hereinafter DTVB) system 100, including transmitter 110 and receiver 170. In DTVB system 100, video data, audio data, and broadcast data are multiplexed into one program transport stream by transmitter 110 for eventual processing by receiver 170 Transmitter 110 is composed of video circuit 120, audio circuit 130, broadcast circuit 140, stream combiner 150, multiplexer circuit 160, and modulator 165. Typically, video circuit 120 generates elementary data streams compressed according to the MPEG2 specification, whereas audio circuit 130 generates elementary data streams compressed upon the basis of the AC3 or HPEG2 specification.

On the other hand, broadcast circuit 140 generates data, oftentimes referred to as "private data", as prepared at the transmitter end in accordance with the needs/requirements of downstream users. Broadcast data implements a technique for providing additional ancillary services to the basic DTVB service at any time; broadcast data does not conform to any standards or format. Examples of broadcast data include: (1) Web home pages; (2) Uniform Resource Locator (URL) of a Web site; and (3) computer programs executable upon a personal computer.

Stream combiner 150 processes the elementary streams generated by video circuit 120, audio circuit 130, and broadcast circuit 140 associated with a given DTVB channel to produce a DTVB transport stream 161, composed of a series of interleaved elementary streams derived from the video, audio, and broadcast data (arriving via leads 121, 131, and 141, respectively). Multiplexer 160 receives transport stream 161, as well as other such transport streams 162, ..., 163 generated for other DTVB channels, and multiplexes these transport streams. Then modulator 165 modulates these transport streams to thereby produce program transport stream 101. In one illustrative DTVB system, each transport stream is propagated as, for example, a vestigial sideband signal, denoted by 8VSB or 16VSB (vestigial sideband modulation with 8 or 16 discrete levels), at a given carrier frequency.

Broadcast data supplied to broadcast data circuit 140 typically is derived from two sources, namely, data elements appearing on lead 142 in database 143, and data elements appearing on lead 144 as dynamically generated by generator 145. Data elements 142 are generally prepared off-line by an entity having knowledge of the interest of the user community served by DTVB system 100 and are stored in database 143 for timely broadcast to these users of DTVB system 100. Database 143 is typically a large storage medium having a storage capacity in the gigabytes range. Data elements 142 and 144 are assigned to a given category and can be composed of, as alluded to earlier, text such as a computer programs and source code for a home page, URL address, and so forth.

Figure 2:
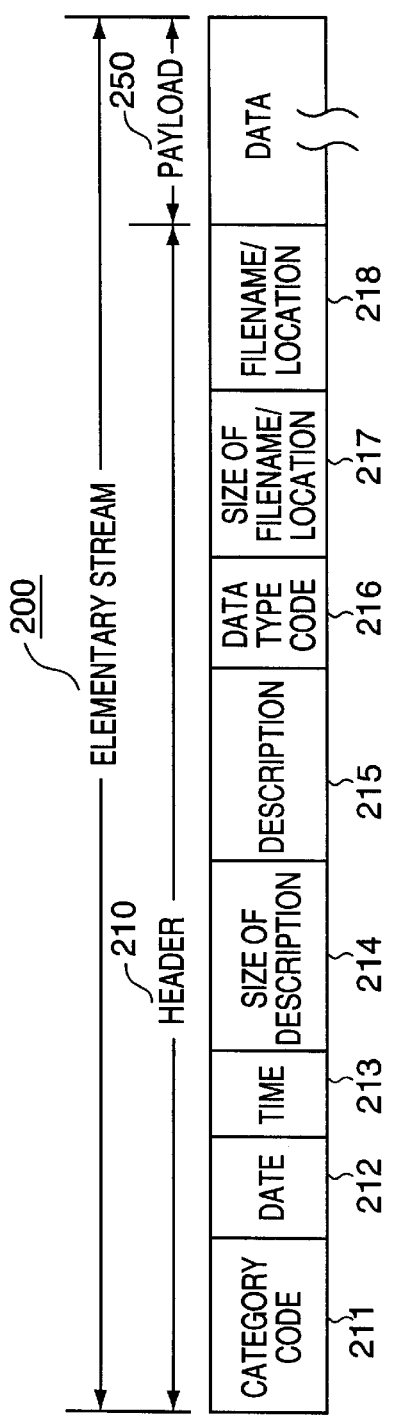
FIG. 2 illustrates the relevant fields in the header of a broadcast data elementary stream.

With reference to FIG. 2A, there is shown a layout of an exemplary broadcast data packet 200 from an elementary stream. The packet typically includes header 210 and payload 250. In particular, header 210 includes the following fields:

field 211—'category code'. Examples of category codes and corresponding category are shown in FIG. 2B;

fields 212—date;

fields 213—time;

field 214—size of description (the following field);

field 215—'description'. An example of a 'description' for the Stock category is "initial public offering for XYZ Company";

field 216—'data type code'. Examples of 'data type code' and the corresponding data types are shown in FIG. 2C;

field 217—size of filename or location (the following field); and field 218—'filename'/'location". An example of a 'filename' for the 'description' example above is "XYZ_IPO".

Payload 250 carries the actual data for the associated header 210. For instance, for the example of the "XYZ Company" above, payload 250 may contain the home page of the XYZ company, in HTML, so that the home page containing more detailed information about the initial public offering may be displayed. The next succeeding elementary data stream might contain a URL (for instance, that of the Securities and Exchange Commission) for which additional information about the initial public offering of the XYZ Company may be obtained.

Data elements 142 and 144 are broadcast on a schedule as determined by the provider of DTVB system 100. The data elements may be repeated, if so desired by the DTVB provider, and the repetition rate of a particular data element is a function of the size and category of the given data element. The data elements, which are broadcast (i.e., transmitted over a one-way channel to numerous users) to the user community via output transport stream 101, can be conveyed with a variety of broadcast techniques, including terrestrial TV, satellite TV, and cable TV.

Figure 3:
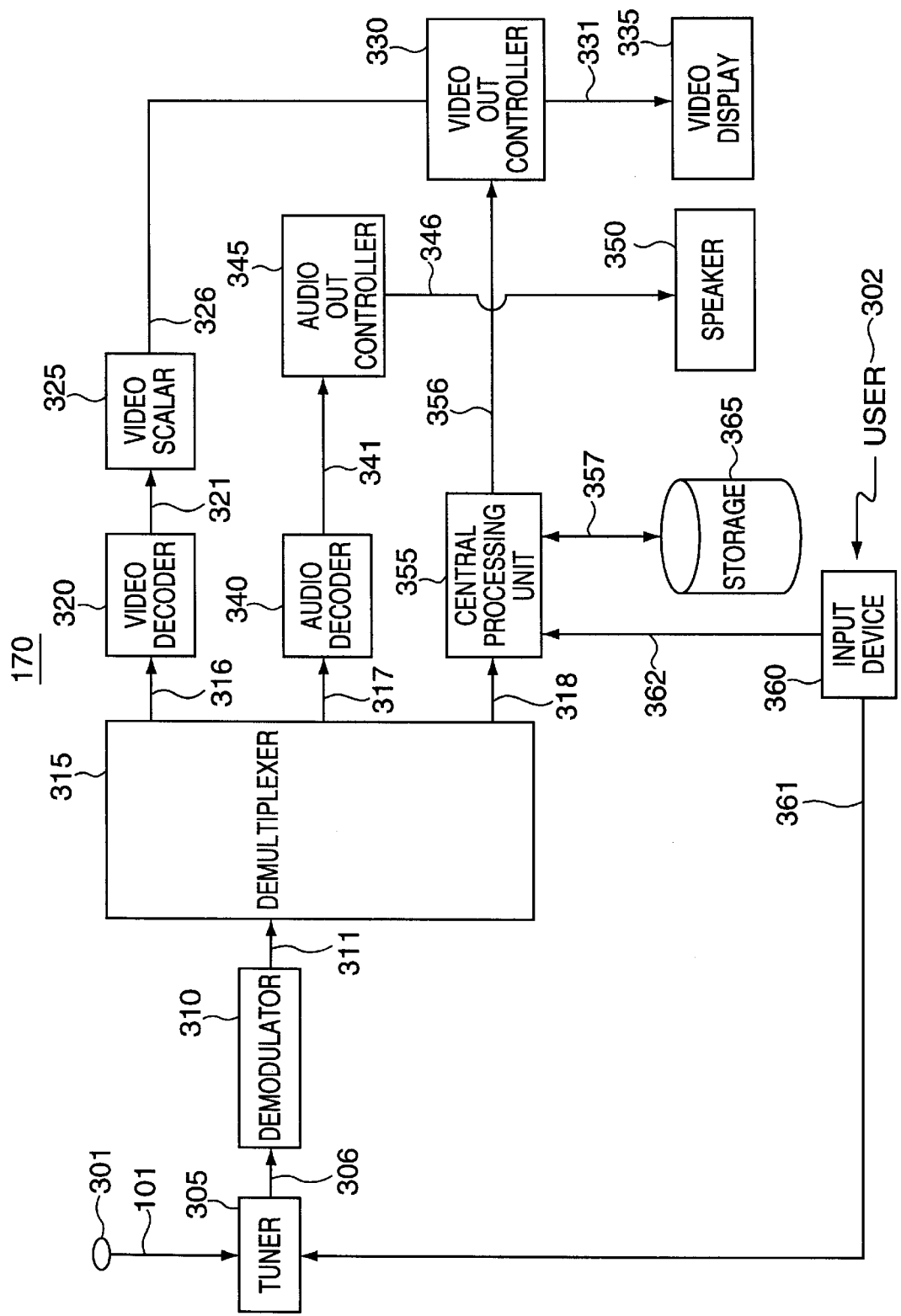
FIG. 3 depicts a high-level block diagram of a conventional receiver illustrative of a broadcast receiver for processing digital TV signals.

In receiver 170 of FIG. 1, now shown in detail in FIG. 3, the transport stream arriving at port 301, composed of compressed video, compressed audio, and broadcast data elementary data streams, is processed by video decoder 320, audio decoder 340, and central processing unit (CPU) 355, respectively.

By way of an overview description of FIG. 3, tuner 305 detects an incoming modulated DTVB signal propagated by a given carrier frequency arriving at port 301. User 302 can select from a set of DTVB channels arriving at port 301 via input device 360 as delivered to tuner 305 over channel selector lead 361.

Demodulator 310 demodulates the modulated signal arriving on lead 306 from tuner 305 to produce a demodulated transport stream on lead 311.

Demultiplexer 315 splits the incoming demodulated transport stream, on the basis of an identifier contained in the header of each packet comprising the transport stream, into compressed video data (lead 316), compressed audio data (lead 317), and broadcast data (lead 318).

Video decoder 320 decompresses the compressed video data arriving via lead 316, and transmits decompressed video data to video scalar 325 via lead 321. Video scalar 325 scales up/down the size of the video data corresponding to the required display size of display device 335; video-out controller 330 receives the scaled video data from scalar 325 via lead 326, and controller 330 converts digital data to an analog video signal suitable for viewing by user 302 on display device 335.

Audio decoder 340 decompresses the compressed audio data arriving via lead 317, and transmits decompressed video data to audio-out controller 345 via lead 341. Audio-out controller 345 converts digital data to an analog audio signal suitable for listening by user 302 on speaker 350, and delivers this analog signal to speaker 350 via lead 346.

CPU 355 handles the broadcast data arriving on lead 318. In particular, if the incoming broadcast data is data such as a home page on the Web, or a URL, this data is stored in disk 365. If the incoming broadcast data is a program, the program may be executed by CPU 355 or stored for later execution. In this case, the result of execution of the program (such as a game), if a display is required, will be generated by CPU 355 and be delivered to video controller 330 via lead 356 for processing and display on device 335. Whether or not the data is to be stored, and when a program is to execute, is under control of user 302 via input device 360 providing control signals over lead 362 to CPU 355.

Illustrative Embodiment of the Present Invention

Figure 4:
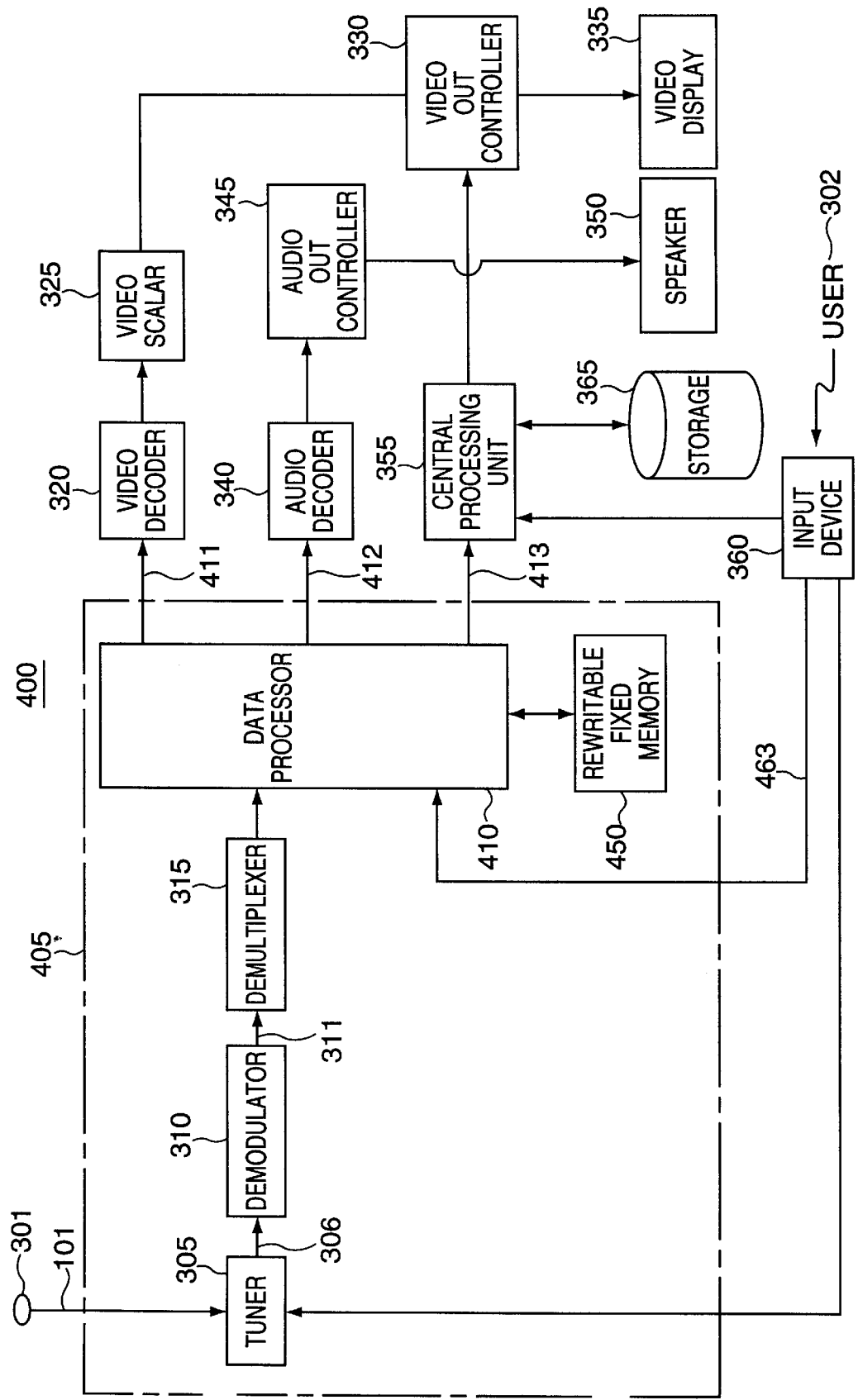
FIG. 4 depicts a high-level block diagram of an illustrative broadcast receiver in accordance with the present invention.

Shown in high-level block diagram 400 of FIG. 4 are two components, namely data processor 410 and rewritable fixed memory 450 (such as a flash memory, e.g., HN29W6411 of Hitachi Ltd.), which are incorporated into the circuitry of FIG. 3 in accordance the present invention. In particular, processor 410 is interposed between demodulator 315 and decoders 320 and 340 as well as CPU 355; processor 410 includes the functionality to be described in detail below. Moreover, as depicted by dotted box 405 encompassing tuner 305, demodulator 310, demultiplexer 315, processor 410, and memory 450, these five components always have power supplied to them even when the remaining components are de-energized or turned-off. In particular, it is typical that video display 335 is a high-power consumption device, so whenever possible, it is desirable to turn-off display 335 when it is not being actively used. On the other hand, to carry out the functions of the present invention, it is required that the components surrounded by box 405 be energized at all times.

As in FIG. 3, tuner 305 receives the TV signal from input port 301 to produce the modulated TV signal on path 306, demodulator 310 demodulates this TV signal to produce the transport data stream on path 311, and demultiplexer 315 detects the compressed video data, the compressed audio data, and the broadcast data conveyed by the transport stream. Data processor 410 splits the transport data stream into compressed video data on path 411, compressed audio data on path 412, and broadcast data (hereafter, "the broadcast data") on path 413 (essentially the same signals that appear on leads 316, 317, and 318, respectively, in FIG. 3). User 302 can control data processor 410 or supply input to data processor 410 with input device 360 via lead 463.

Data processor 410 also effects the following process, as depicted by flow diagram 500 of FIG. 5A:

(a) block 505—start of the process (b) block 510—upon initialization of processor 410, generate and initialize a blank table in rewritable memory 450 to be filled in during parsing of the broadcast data elementary streams (c) block 515—store in processor 410 a category list supplied by the user via input device 360

(d) block 520—process the transport stream to obtain the broadcast data, including the header and payload, if any (e) block 525—read 'category code' in header (f) block 530—decide if the 'category' of the incoming broadcast data is of interest to the user (g) block 535—if the 'category' is not of interest to the user, bypass the broadcast data (h) block 540—if the 'category' is of interest, determine if the 'data type code' of the header indicates a location (i) block 545—if the 'data type code' indicates that a location is conveyed by the header, store that location into rewritable memory 450

(j) block 550—if the 'data type code' indicates that the payload is to be stored, obtain the 'filename' from the header and store the 'filename' and the payload into rewritable memory 450 (in another embodiment, it may be that a 'filename' is not provided, but the 'data type code' indicates a payload follows, then associate the payload with the 'description' contained in the header)

(k) block 555—fill the next available table entry with the header information for later recall by the user (l) block 560—determine if the user desires to end processing of the broadcast data; if not, return to block 520

(m) block 565—end the processing when so indicated by the user.

(It is again noted, by way of reiteration, that process (a)–(m) is carried out irrespective of whether or not the components not encompassed by box 405 of FIG. 4 have power supplied to them.)

An exemplary table as created by (a) and as filled in by (k) is depicted in FIG. 6. Column 610 contains category information, columns 620 and 630 contain date and time information, respectively, column 640 contains description information, and column 650 contains filename or location information. For example, row 601 contains information derived from a first broadcast data elementary stream conveying data having an associated filename ('category1', . . . , 'filename1'), whereas row 603 contains information derived from another broadcast data elementary stream conveying a location ('category3', . . . , 'location1').

Figure 5B:
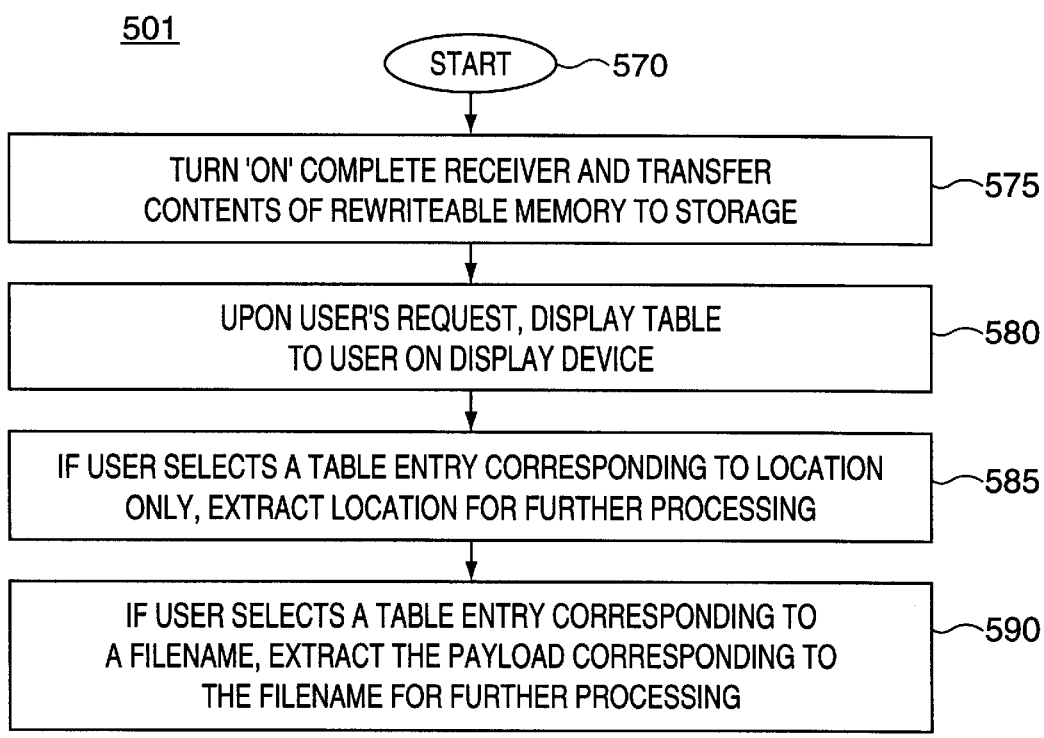
FIG. 5 is a flow diagram representative of the operation of the circuitry of FIG. 4.

At some later time, user 102 desires to recall the data stored in rewritable memory 450 as stored by the processing depicted in FIG. 5A. In this aspect of the present invention, as now depicted by flow diagram 501 of FIG. 5B, the user energizes the complete system of FIG. 4, so that the remaining components (i.e., those outside box 405 which signifies the low power consumption mode of receiver 400), are fully operational. According to flow diagram 501, the following processing occurs:

(a) block 570—starts the transfer process (b) block 575—with receiver 400 fully ON, user 102 initiates the transfer of data stored in rewritable memory 450 to storage 365, including the table exemplified in FIG. 6

Figure 7:
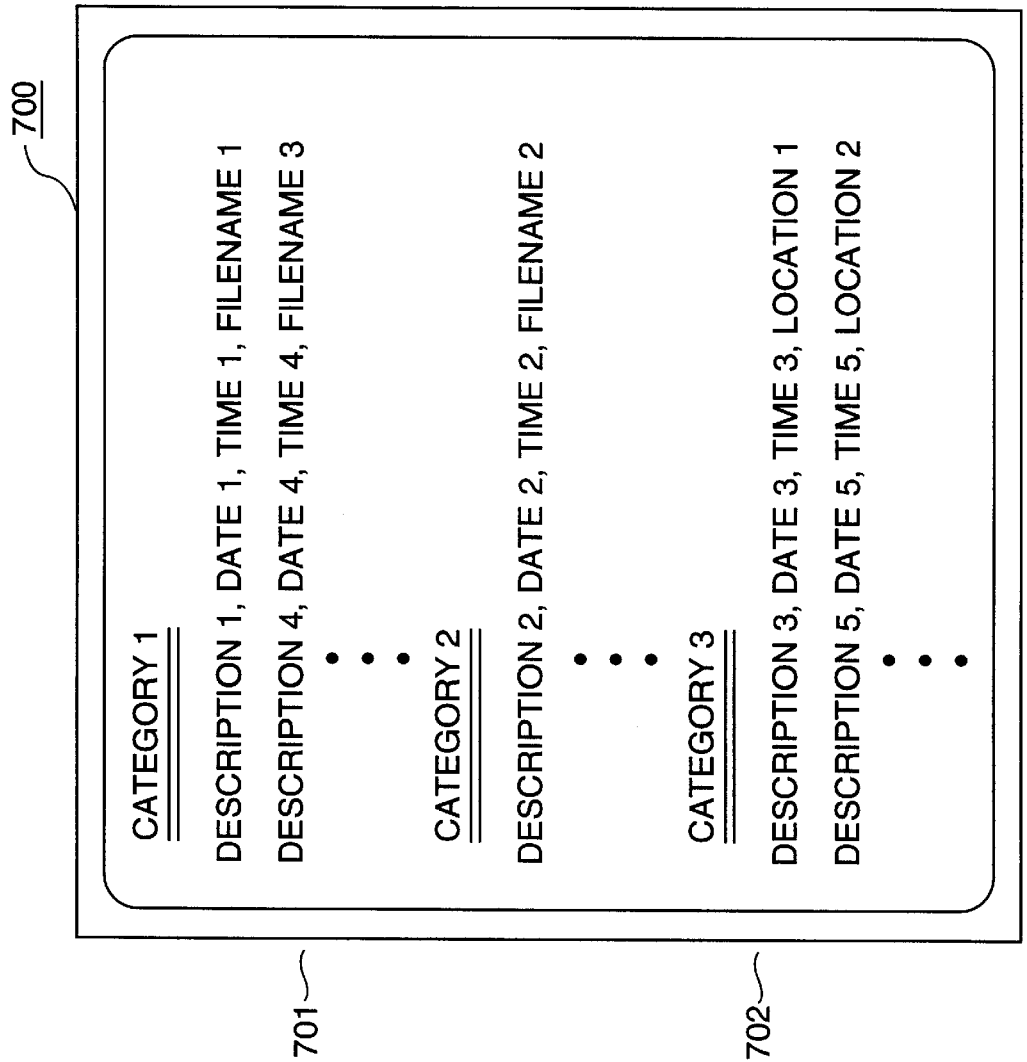
FIG. 7 shows information corresponding to the table entries of FIG. 6 as displayed to the user on the video display device.

(c) block 580—also upon the user's request, the table is displayed in a readable form to the user. An example of the table of FIG. 6 reformatted for display on display device 335 is shown by display 700 of FIG. 7

(d) block 585—if the user then selects a table entry corresponding to location information (e.g., line 702 of FIG. 7), then the location information is extracted for further processing under control of the user (for instance, CPU 355 may access a URL address and display the page having the given URL)

(e) block 590—if the user then selects a table entry corresponding to filename, then the payload corresponding to the filename is extracted for further processing under control of the user (for instance, a game program may be loaded into CPU 355 and the game program executed by CPU 355, with any output results displayed on device 335).

Although various embodiments which incorporate the teachings of the present invention have been shown and described in detail herein, those skilled in the art can readily devise many other varied embodiments that still incorporate these teachings.

What is claimed is:

1. A method for receiving, in a receiver, broadcast data propagated by a multiplexed and modulated digital signal, the signal including video data and at least one elementary stream conveying the broadcast data, the broadcast data including a header and, if necessary, a payload, the receiver including: (i) a tuner for tuning to the signal under control of a user of the receiver; (ii) a demodulator, coupled to the tuner, for demodulating the signal to generate a transport stream conveying the broadcast data; (iii) a data processor responsive to control signals from the user for processing the broadcast data; (iv) a rewritable memory coupled to the data processor; and (v) a display device for displaying the video data as well as displayable data corresponding to the broadcast data, the method comprising the steps of (a) applying power to the tuner, the demodulator, the data processor, and the rewritable memory independent of the on-off state of the display device, (b) generating and storing a table in the rewritable memory to be filled in by the data processor, (c) processing in the data processor the header to obtain field information conveyed by the header, (d) if the field information indicates that the broadcast data contains a filename to be stored, storing the filename and the payload of the broadcast data corresponding to the filename in the rewritable memory, and proceeding to step (f), (e) if the field information indicates that the broadcast data contains a location to be stored, storing the location in the rewritable memory, and (f) storing at least some of the field information as an entry in the table for later recall by the user.

2. The method as recited in claim 1 wherein the receiver further includes: a central processing unit; a storage device coupled to the central processing unit; and a video circuit responsive to the central processing unit and coupled to the display device, the method further including the steps of (g) energizing the display device, the central processing unit, the storage device, and the video circuit, (h) transferring contents of the rewritable memory to the storage device, (i) accessing the table from the storage device under control of the user at the time of later recall, (j) displaying contents of the table on the display device upon processing of the table by the central processing unit and the video circuit, (k) selecting a table entry in the displayed table corresponding to broadcast data now of interest to the user, (l) if the entry corresponds to the location of the broadcast data, extracting the location from the storage device for further processing by the central processing unit, and (m) if the entry corresponds to a filename, extracting the payload corresponding to the filename from the storage device for further processing by the central processing unit.

3. A method for receiving, in a receiver, broadcast data propagated by a multiplexed digital television signal, the signal including video data and at least one broadcast data elementary stream conveying the broadcast data, the broadcast data including a header and, if necessary, an associated payload, the header including a field that conveys an interest category assigned to the broadcast data, the receiver including: (i) a tuner for tuning to the signal under control of a user of the receiver; (ii) a demodulator, coupled to the tuner, for demodulating the signal to generate a transport stream conveying the broadcast data; (iii) a data processor responsive to control signals from the user for processing broadcast data; (iv) a rewritable memory coupled to the data processor; and (v) a display device for displaying the video data as well as displayable data corresponding to the broadcast data, the method comprising the steps of (a) applying power to the tuner, the demodulator, the demultiplexer, the data processor, and the rewritable memory independent of the on-off state of the display device, (b) generating and storing a table in the rewritable memory to be filled in by the data processor, (c) receiving from the user at least one interest category of interest to the user, and storing the at least one category in the data processor, (d) processing in the data processor the header to obtain field information conveyed by the header, (e) if the interest category of the broadcast data matches with the at least one interest category stored in the data processor for the user, proceeding to step (f); otherwise, bypassing the broadcast data, (f) if the field information indicates that the broadcast data contains a filename to be stored, storing the filename and the payload of the broadcast data corresponding to the filename in the rewritable memory, and proceeding to step (h), (g) if the field information indicates that the broadcast data contains a location to be stored, storing the location in the rewritable memory, and (h) storing at least some of the field information in the table for later recall by the user.

4. The method as recited in claim 3 wherein the receiver further includes: a central processing unit; a storage device coupled to the central processing unit; and a video circuit responsive to the central processing unit and coupled to the display device, the method further including the steps of (i) energizing the display device, the central processing unit, the storage device, and the video circuit, (j) transferring contents of the rewritable memory to the storage device under control of the user, (k) accessing the table from the storage device under control of the user at the time of later recall, (l) displaying contents of the table on the display device upon processing of the table by the central processing unit and the video circuit, (m) selecting a table entry in the displayed table corresponding to broadcast data of interest to the user, (n) if the entry corresponds to the location of the broadcast data, extracting the location from the storage device for further processing by the central processing unit, and (o) if the entry corresponds to a filename, extracting the payload corresponding to the filename from the storage device for further processing by the central processing unit.

5. A method for receiving, in a receiver, broadcast data propagated by a multiplexed and modulated digital television signal, the signal including a series of elementary streams conveying the broadcast data as well as video data, the broadcast data including a header and, if necessary, an associated payload, the header including a section that conveys an interest category assigned to the broadcast data, the receiver including: (i) a tuner for tuning to the signal under control of a user of the receiver; (ii) a demodulator, coupled to the tuner, for demodulating the signal to generate a transport stream conveying the broadcast data; (iii) a data processor responsive to control signals from the user for processing broadcast data; (iv) a rewritable memory coupled to the data processor; and v a display device for displaying the video data as well as displayable data corresponding to the broadcast data, the method comprising the steps of:

(a) applying power to the tuner, the demodulator, the demultiplexer, the data processor, and the rewritable memory independent of the on-off state of the display device, (b) generating and storing a table in the rewritable memory to be filled in by the data processor, (c) receiving from the user at least one interest category of interest to the user, and storing the at least one category in the data processor, (d) processing in the data processor the header to obtain field information conveyed by the header, (e) it the interest category of the broadcast data matches with the at least one interest category stored in the data processor for the user, proceeding to step (f); otherwise, bypassing the broadcast data, (f) if the field information indicates that the broadcast data contains a filename to be stored, storing the filename and the payload of the broadcast data corresponding to the filename in the rewritable memory, and proceeding to step (h), (g) if the field information indicates that the broadcast data contains a location to be stored, storing the location in the rewritable memory, (h) storing at least some of the field information in the table for later recall by the user, and (i) returning to step (d) to process the next incoming one of the broadcast data elementary streams.

6. The method as recited in claim 5 wherein the receiver further includes: a central processing unit; a storage device coupled to the central processing unit; and a video circuit responsive to the central processing unit and coupled to the display device, the method further including the steps of (j) energizing the display device, the central processing unit, the storage device, and the video circuit, (k) transferring contents of the rewritable memory to the storage device under control of the user, (l) accessing the table from the storage device under control of the user at the time of later recall, (m) displaying contents of the table on the display device upon processing of the table by the central processing unit and the video circuit, (n) selecting a table entry in the displayed table corresponding to broadcast data now of interest to the user, (o) if the entry corresponds to the location of the broadcast data, extracting the location from the storage device for further processing by the central processing unit, and (p) if the entry corresponds to a filename, extracting the payload corresponding to the filename from the storage device for further processing by the central processing unit.

7. The method as recited in claim 6 wherein, if the payload corresponds to an executable program, the step of further processing by the central processing unit includes the step of executing the executable program.

8. A receiver for receiving broadcast data propagated by a multiplexed and modulated digital television signal, the signal including video data and at least one elementary stream conveying the broadcast data, the broadcast data including a header and, if necessary, a payload, the receiver including a tuner for tuning to the signal under control of a user of the receiver, a demodulator, coupled to the tuner, for demodulating the signal to generate a transport stream conveying the broadcast data, a data processor, responsive to input from the user, for processing the broadcast data, a rewritable memory, coupled to the data processor, for storing the broadcast data, and a display device, responsive to the data processor, for displaying, when energized, the video data as well as displayable data representative of the header and payload of the broadcast data, the tuner, the demodulator, the data processor, and the rewritable memory being continuously on independent of the on-off state of the display device, the rewritable memory including a table for storing the broadcast data, the data processor including a header processor for processing the header to obtain field information conveyed by the header, a field processor to determine if the field information indicates that the broadcast data contains a filename to be stored and means for storing the filename and the payload of the broadcast data corresponding to the filename in the rewritable memory, the field processor also being used to determine if the field information indicates that the broadcast data contains a location to be stored and means for storing the location only in the rewritable memory, and a storage processor for storing at least some of the field information as an entry in the table for later recall by the user.

9. The receiver as recited in claim 8 wherein the header includes a category field, the data processor stores a set of categories of interest to the user, and the data processor includes a category processor for bypassing the broadcast data whenever the category field does not match a category from the set of categories.

10. The receiver as recited in claim 8 wherein the rewritable memory is a flash memory.

11. The receiver as recited in claim 10 further comprising central processing unit coupled to the data processor, a storage device coupled to the central processing unit, and a video circuit responsive to the central processing unit and coupled to the display device, the central processing unit, the storage device, and the video circuit being energized concurrently with the display device, the data processor further including a transfer processor for transferring contents of the rewritable memory to the storage device under control of the user, the central processing unit including an access processor for accessing the table from the storage device under control of the user at the time of later recall, a display processor for displaying contents of the table on the display device upon processing of the table by the central processing unit and the video circuit, a selector processor, under control of the user, for selecting a table entry in the displayed table corresponding to broadcast data now of interest to the user, a table processor to determine if the table entry corresponds to the location of the broadcast data and, if so, to extract the location from the storage device for further processing by the central processing unit, and the table processor also used to determine if the table entry corresponds to a filename and, if so, to extract the payload corresponding to the filename from the storage device for further processing by the central processing unit.

12. The method of claim 1, wherein said step of storing at least some of the field information as an entry in the table for later recall by the user includes:

storing date and time information obtained from said field information in said table entry.

13. The method of claim 12, wherein said step of storing at least some of the field information as an entry in the table for later recall by the user further includes:

storing category and description information obtained from said field information in said table entry.

14. The method of claim 3, wherein said step of storing at least some of the field information as an entry in the table for later recall by the user further includes:

storing description information obtained from said field information in said table entry.

15. The method of claim 14, wherein said step of storing at least some of the field information as an entry in the table for later recall by the user further includes:

storing date and time information obtained from said field information in said table entry.

16. The method of claim 5, wherein said step of storing at least some of the field information in the table for later recall includes:

storing category and description information obtained from said field information in said table entry.

17. The method of claim 5, wherein said step of storing at least some of the field information in the table for later recall includes:

storing date information obtained from said field information in said table entry.

18. The method of claim 17, wherein said step of storing at least some of the field information in the table for later recall further includes:

storing description information obtained from said field information in said table entry.

19. The method of claim 2, wherein said step of storing at least some of the field information as an entry in the table for later recall includes:

storing date and time information obtained from said field information in said table entry.

20. The method of claim 2, wherein said step of storing at least some of the field information as an entry in the table for later recall by the user includes:

storing description information obtained from said field information in said table entry.

* * * * *